United States Patent [19]

Rusch et al.

[11] Patent Number: 4,777,835
[45] Date of Patent: Oct. 18, 1988

[54] METHOD FOR ASCERTAINING THE PHYTO-SPECIFIC CHARACTERISTICS OF CROPS GROWN BY DIFFERENT METHODS

[76] Inventors: Volker Rusch, Schwalbenweg 6, 6348 Herborn; Edwin Pahlich, Schillerstrasse 3, 6302 Lich; Kurt Zimmermann, Mittelstrasse 17, 6348 Herborn-Seelbach, all of Fed. Rep. of Germany

[21] Appl. No.: 723,761

[22] Filed: Apr. 16, 1985

[30] Foreign Application Priority Data

Apr. 17, 1984 [DE] Fed. Rep. of Germany ....... 3414572

[51] Int. Cl.$^4$ .................. G01N 33/483; G01N 5/00; G01N 5/02; G01N 5/04
[52] U.S. Cl. ........................... 73/866; 73/73; 73/432.1; 436/63
[58] Field of Search ............. 73/866, 432.1, 73, 865, 73/74, 76; 436/63

[56] References Cited

U.S. PATENT DOCUMENTS 3,994,156 11/1976 Koster ............................ 73/76

FOREIGN PATENT DOCUMENTS 590678 2/1978 U.S.S.R. ........................ 73/76
985015 3/1965 United Kingdom ........... 73/432.1

Primary Examiner—Tom Noland
Attorney, Agent, or Firm—McCormick, Paulding & Huber

[57] ABSTRACT

In a method for ascertaining phyto-specific characteristics for differently grown crops to differentiate between crop plants that have been subjected to different methods of growing, the following plant parameters $FG_{max}$ = maximum fresh weight,
TG = dry weight
AcP = proportion by weight of cell components capable of swelling
$AH_2O$ = proportion by weight of adsorptive water
$WH_2O$ = proportion of cell water by weight are ascertained and are related to each other in the form of a ratio relativizing locality-dependent modifications. In accordance with a second form of the invention an enzyme, such as glutamate dehydrogenase, or an enzyme mixture present in the plants to be investigated and reacting particularly sensitively to an alteration in the supply of nitrogen, is isolated and the relaxation time $\tau$ of the enzyme is ascertained for different enzyme concentrations.

3 Claims, 1 Drawing Sheet

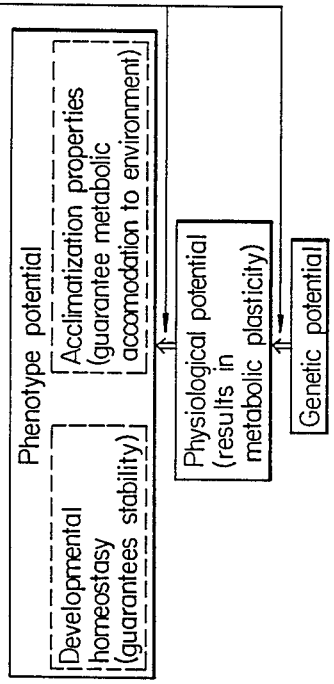
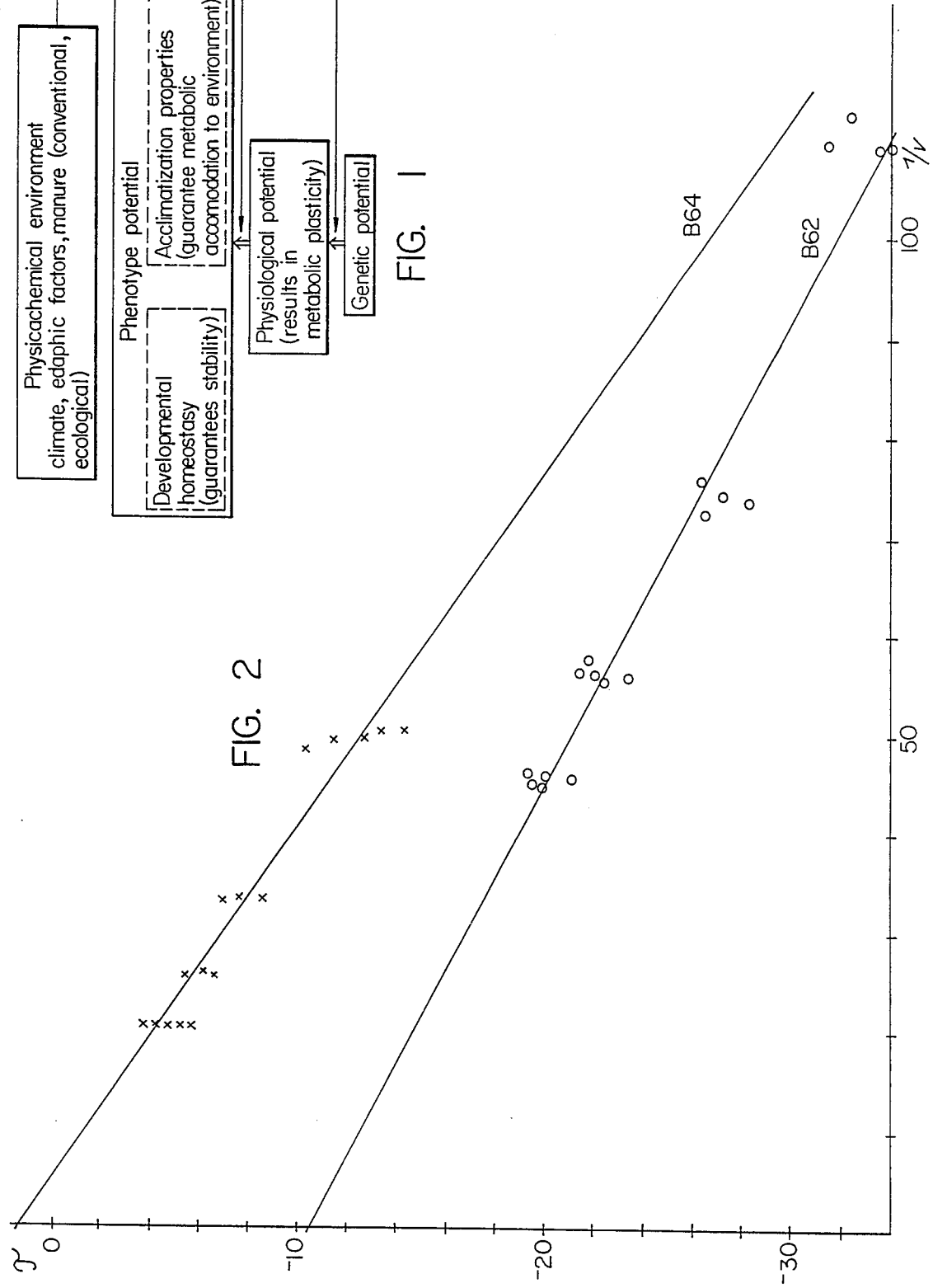

METHOD FOR ASCERTAINING THE PHYTO-SPECIFIC CHARACTERISTICS OF CROPS GROWN BY DIFFERENT METHODS

BACKGROUND OF THE INVENTION

The invention relates to a method for ascertaining phyto-specific characteristics for differently grown crops to differentiate between crop plants that have been subjected to different methods of growing, such as conventional methods of growing with standard nitrogen mineral fertilizer, biological methods with natural dung and biologically dynamic methods.

In conventionally conducted agriculture and horticulture crops are provided with nitrogen on a large scale by the application of the inorganic precursors $NO_3^-$, $NH_4^+$ of mineral nitrogen fertilizers before or during germination or the early phases of vegetation of the crop plants. In comparison with ecological cultivation, manuring with mineral fertilizers as a source of nitrogen causes changes in the vegetative body of the plant. Such variations include for example an enhanced production of biomass, reduction in the dry weight in comparison with the dry weight, premature signs of decomposition after harvesting, less resistance to fungal and insect attack etc.

Ecological (or biological) cultivation dispenses with such use of mineral nitrogen fertilizers so that there is no spasmodic swamping of the metabolic process by mineral nitrogeneous precursors. Therefore the consequences, of which some examples have been noted, of the application of nitrogeneous manure do not occur.

SUMMARY OF THE INVENTION

One object of the present invention is to devise simple methods for ascertaining characteristic phyto-specific data, that when applied taking into account the physiology or biochemistry of plants, make possible an unambiguous distinction to be drawn, or a clear recognition to be made, of plants in terms of their methods of cultivation (i.e. by conventional or ecological cultivation).

A first method in accordance with the invention for effecting this purpose is based on the concept that the spasmodic swamping or flooding of the crop with nitrogeneous mineral fertilizers represents, from the point of view of plant physiology, a undesired interference in the so-called steady state structure of metabolism. The crop reacts to a spasmodic supply of nitrogen with adaptations in metabolism, i.e. it acclimatizes to the new conditions and expresses certain characteristic features. Inter alia, a spasmodic supply of nitrogen leads to the formation of larger cells (a large amount of biomass), whose dry matter content (cell wall material, nonvolatile cell components) and materials capable of swelling (proteins and other hydrophilic macromolecules) differ from those of unmanured plants. On the basis of such considerations data related to the water economy of the plants form a footing for the definition of quantative distinguishing features.

Working on the hypothesis of a large biomass I expected that the relevant data would be specific to locality. By relativizing the data the intent was more especially to generally cancel out locality related modifications (i.e. the effects of locality of cultivations).

On the basis of these concepts the objects of the invention are to be attained using a first method in which the following plant parameters $FG_{max}$ = maximum fresh weight,
$TG$ = dry weight
$AcP$ = proportion by weight of cell components capable of swelling
$A_{H2O}$ = proportion by weight of adsorptive water
$W_{H2O}$ = proportion of cell water by weight are ascertained and are related to each other in the form of a ratio relativizing locality-dependent modifications. Further beneficial developments of this first method of the invention are to be seen in claims.

A further aspect of the invention for attaining the objects stated is based on the concept that the acclimatization of plants to different conditions of nitrogen supply leads to significant enzymes in nitrogen metabolism being modulated: they adapt their catalytic properties to the respective conditions. Therefore enzymes are suitable substances to characterize a system and to distinguish different systems from each insofar as different enzyme characteristics occur. It is known of the plant enzyme glutamate dehydrogenase that it reacts very sensitively to alterations in N supply. In addition to other phenomena there is a particularly marked change in the ratio of forward and reverse reaction of this enzyme.

On the basis of the concept of differing enzyme characteristics the above objects of the invention are attained in that an enzyme, such as GDH, or enzyme mixture present in the plants to be investigated and reacting particularly sensitively to an alteration in the supply of nitrogen, is isolated and the relaxation time $\tau$ of the enzyme is ascertained for different enzyme concentrations. The characteristic data as ascertained in accordance with the first and second methods of the invention may further be used jointly to provided a distinguishing criterion for plants grown under different conditions.

FIG. 1 is a block diagram to indicate interaction patterns in plant growth and development.

FIG. 2 is a graphic plot of relazation time versus the reciprocal of $V_{net}$ for different enzyme concentrations.

DETAILED ACCOUNT OF INVENTION

A more detailed account of the invention will now follow based on examples.

Firstly the invention will be described in the form of the first method as referred to above with further possible modifications.

Genetically uniform plant material (identical cultivated varieties, as for example carrots) grown under conventional conditions (with the application of mineral nitrogen fertilizer), biological organic conditions (manured with dung) and under biological dynamic conditions are compared.

Plants or parts thereof of the same physiological age (leaves, roots, tubers) are compared.

In accordance with the invention the following readings are taken and relativized to generally cancel out modulating influences (localities) in the following manner.

1. Ascertainment of the proportion "a" of turgescent bodies.

The proportion "a" of turgescent bodies (i.e. bodies capable of swelling) is indicative to a certain extent of the absolute amount of turgescent components (proteins, cellulose etc.) in the cell fraction.

To ascertain the proportion "a" of turgescent bodies the acetone powder method for example may be used. In the method the sample material is homogenized in excess cold acetone, the homogenate filtered and the solids washed with an excess of acetone. The vacuum filtered tissue disks are treated to obtain a precise plant acetone powder fraction.

The turgescent body fraction "a" is obtained from the ratio of one gram of said plant powder AcP to grams sample material with the maximum fresh weight $FG_{max}$, i.e.:

$$a = \frac{gAcP}{gFG_{max}}$$

2. Ascertainment of the turgescent body characteristic "b".

Using the acetone extract powder obtained, the turgescent body characteristic "b" is obtained by isopiestic saturation and measuring the vapor pressure at a given temperature. The turgescent body characteristic defines the sum of the specific hydration properties of the turgescent cell components of the acetone powder fraction. The turgescent body characteristic "b" may be calculated as the ratio of grams adsorption of $H_2O = gA_{H2O}$ to grams of acetone extract powder = gAcP $$b = \frac{gA_{H2O}}{gAcP}$$

3. The relativized water characteristic "x".

In order to obtain a coefficient "x" which is generally uninfluenced by external parameters and which is termed the water characteristic, the turgescent body fraction "a" and the turgescent body characteristic are related to each other as the ratio $$x = \frac{gA_{H2O} \cdot gFG_{max}}{(gAcP)^2}$$

4. The dry weight characteristic "y".

It is known that plant cells taken from crops grown in keeping with conventional agricultural practice are relatively rich in water and therefore have a low dry weight percentage. The overall cell water content is denoted $W_{H2O}$ and the dry weight (as determined after for example 12 hours of drying sample material at 80° C.) is denoted TG. The individual factors $FG_{max}$, TG and $W_{H2O} = FG_{max} - TG$ for samples may show a substantial scatter and they as such do not provide a reliable guide to the differences between plant materials grown by different methods. In accordance with the invention a ratio of the parameters is used. The following ratio equation constitutes a preferred way of linking the above parameters:

$$\frac{W_{H2O}}{TG} : 1 = FG_{max} : y$$

The value "y" is denoted the dry weight characteristic. It follows that $$y = \frac{FG_{max} \cdot TG}{W_{H2O}}$$

The factors x (relativized water characteristic) and y (the dry weight characteristic) of the invention are linked with each other exponentially as indicated below in order to be able to distinguish between plants from biologically and conventionally grown plants, effects due to locality of cultivation having generally no effect on the results.

plant factor $=(yx)-1$    in accordance with the invention

The following table 1 indicates the parameters $FG_{max}$, AcP, $A_{H2O}$, and $W_{H2O}$ for carrots (roots), the x (relativized water characteristic) and the y (relativized dry weight characteristic) data calculated from the parameters and the $(y^x)-1$ values calculated therefrom.

TABLE 1

| Plant material | $gFG_{max}$ | $G_{AcP}$ | $gA_{H2O}$ | $gW_{H2O}$ | gTG | x | y | $(y^x)-1$ |
|---|---|---|---|---|---|---|---|---|
| Conventional* | 4.691 | 0.2461 | 0.2409 | 4.2280 | 0.4630 | 18.7 | 0.515 | $245 \cdot 10^3$ |
| Ecological** | 4.615 | 0.2811 | 0.2517 | 4.1152 | 0.4997 | 14.7 | 0.560 | $5.0 \cdot 10^3$ |
| Ecological*** | 4.671 | 0.2766 | 0.2632 | 4.1854 | 0.4853 | 16.1 | 0.542 | $19.2 \cdot 10^3$ |

*with nitrogen fertilizer.
**with natural dung.
***biodynamic.

The values for the parameters were each the average of 8 separate readings.

The table indicates that the $(y^x)-1$ factor for conventionally grown carrots at $245 \times 10^3$ very markedly differs from the corresponding $(y^x)-1$ values for biologically organically grown carrots (using dung) and biologically dynamically grown carrots with values of $5.0 \cdot 10^3$ and $19.2 \cdot 10^3$ so that in view of these results one may be certain of a reliable and objective method of distinguishing the carrots (root material) grown conventionally and ecologically.

Therefore the invention shows a simple path to ascertain factors for different sorts of plants (as for example vegetables, fruit and grain), such factors being typical for certain methods of growing (i.e. conventional and ecological) but which are markedly different to each other, the influence of the locality of growth being able to be discounted.

In what follows an account will be given of the invention in accordance with the second method thereof as developed with the claimed features pertaining thereto.

It has been mentioned initially that glutamate dehydrogenase reacts very sensitively to changes in the nitrogen supply, one example of this being a striking change in the ratio between the forward and reverse reactions of this enzyme. The forward reaction is characterized by the reducing animation of the α-ketoglutaric acid and by the reverse reaction of the oxidative di-amination of the acid.

In order to be able to measure both changes in one batch a relaxation-kinetic method has been evolved within the compass of the invention.

Relaxation characteristic

Enzymes catalize the reversible conversion of substrate S to the product P. The following principle applies:

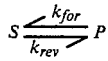

The velocity constants $k_{for}$ and $k_{rev}$ characterized the enzyme catalyst. They encode the $V_{max}$ and $k_M$ values for both reaction directions and furthermore reflect the equilibrium situation of the reaction under given reaction conditions (they comprise the equilibrium constant and the equilibrium concentrations of the substrate(s) and products(s)). If the treatment of a plant leads to certain enzymes being modified (reflected in a change of their $K_M$ and $V_{max}$ parameters), then this may be demonstrated by determining the $k_{for}$ and $K_{rev}$ velocity constants. The relaxation time $\tau$ is a generic characteristic, that reflects both velocity constants, i.e.

$$\tau = \frac{1}{k_{for} + k_{rev}}$$

The relaxation time $\tau$ may readily be ascertained using normal and generally known methods, for which purpose the enzyme solution (a given volumetric fraction of the plant extract) is added to given test mixture (which contains the substrates and products of the glutamate dehydrogenase reaction) and the then ensuing reaction is measured or registered in Warburg's optical test. The data are evaluated using the Guggenheim routine. The following generalizing relationship applies:

$$-\frac{d\Delta S}{dt} = V_{net} = \Delta S \frac{1}{\tau}$$

The reaction velocity $V_{net}$—$(V_{for}-V_{rev})$ depends on the reciprocal of the relaxation time 1 and the deviation of the system from the equilibrium $\Delta S$. An increase in the enzyme concentration will have a driving effect on $V_{net}$. There is therefore a linear dependency between $V_{net}$ and $1/\tau$ or between $\tau$ and $1/V_{net}$. On plotting $\tau$ against $1/V_{net}$ for different enzyme concentrations, the outcome will be a straight line. If the enzymes to be compared differ in respect of their enzyme parameters, the result will be a graph with straight lines having the same slope, but with differing y transitions.

The FIG. 2. graph represents such a test on carrots ($B_{61}$ being from biological cultivation and $B_{62}$ from conventional cultivation). The relaxation times dependent on the enzyme concentration are in each case on a straight line with differing y transitions.

The two straight lines however also differ in their slopes (formally the slope is $\Delta S$). Since $\Delta S$ is predetermined and is identical for the two kinetic situations, one might conclude that the two enzymes catalyze towards "different equilibria". This is however not possible for theoretical reasons, since catalysts do not change the equilibrium. The only possible interpretation of the finding is therefore that one of the enzymes tends towards a "pseudo-equilibrium", that is to say for example that owing to the changed feedback properties (obstruction by product) it ceases to have an effect before the $V_{net}$ equilibrium is reached. Therefore changed enzyme parameters (different y transitions) are tied to a modified control behavior (f.i. modified feedback). In accordance with the invention a factor is derived from the two changes by dividing the y transition (the value of $\tau$ for $1/V \rightarrow 0$) by the amount of the slope of the straight lines, as may be seen from table 2:

TABLE 2

| curve | slope | y transition | factors |
|---|---|---|---|
| $B_{61}$ | −0.28 | +1.8 | −6.4 |
| $B_{62}$ | −0.21 | −10.4 | +49.5 |

The factors ascertained in accordance with the invention make it possible to characterize the plant materials and to distinguish between different cultivation sources. The relaxation test method is somewhat more involved than the acclimatization method described initially but may in some cases be used with advantage, as for instance in order to clear up doubtful cases.

APPENDIX A

We regard the embibed fresh weight (maximal fresh weight) as a "stable property" of standarized segments of mature carrot tissues. All data measured are related to this internal standard.

As "variable property" a hydrophilic fraction of proteins and acetone unsoluble components (acetone powder) was used. This gives a quantitative measure of the acclimatization effect (Table 1).

TABLE 1

| Relative acetone powder content per "maximal fresh weight or carrots from conventional and ecological agriculture. Acetone Powder | | |
|---|---|---|
| | conventional | ecological |
| $\bar{x}$ | $55.13 \cdot 10^{-3}$ | $60.61 \cdot 10^{-3}$ |
| n | 8 | 8 |

Significance in difference: P = 0.005

The water absorbing potency of the acetone powder as determined by the isopiestic method gives a qualitative measure of the acclimatization effect. Combining the quantitative and qualitative measures and relating it to the maximal fresh weight characterizes the hydrophilic fraction H (Table 2).

TABLE 2

| Characteristic of the hydrophlic fraction H from carrots of coventional and ecological agriculture. H | | |
|---|---|---|
| | conventional | ecological |
| $\bar{x}$ | 18.05 | 12.91 |
| n | 8 | 8 |

Significance of difference: P < 0.0027

Empirically it was found that growth equations of the $$\text{type } \frac{dy}{dx} = k \frac{y}{x}$$

can be used in order calculate a Phenotype Index x is the independent variable (our stable property at a given time) and k a tissue specific coefficient depending on the environment. We calculate the following indices (Table 3).

TABLE 3

Phenotype index of carrot tissue of conventional and ecological agriculture.

| | Phenotype index | |
|---|---|---|
| | conventional | ecological |
| $\bar{x}$ | $7.10^9$ | $7.10^9$ |
| n | 8 | 8 |

Significance of difference: $P = 0.008$

The derivation of a growth function is in progress which includes also further experimental parameters. We are testing now whether the concept can be applied also to other plants than carrots and how the indices of single plant species vary with the environment.

APPENDIX B

Based on the concept depicted in FIG. 1 we started to analyze plant material from conventional and ecological agriculture (exemplified here with results from carrots). Using "stable" and "variable" criteri we intend to calculate characteristic indices for those plants. Some conceptional aspects are shown here.

The *genetic potential* of a plant includes the total information encoded in the DNS. Usually the natural environments prevent the expression of the full genetic potential ("highest yield").

The *physiological potential* results from that portion of the genetic potential expressed at a time and under a given environmental condition. It is best visualized by the respective "maximal growth patterns". The phenotype resulting from a respective physiological potential marks the flexible response of plants towards changing environments. (*Phenotype potential*) (ecotypes of plants).

The *phenotype potential* is composed from two properties.

(1) A stable property guarantees the development of species specific characteristics and is nearly independent from the respective environment. This property called "*developmental homeostasy*". Only the overall size varies. A size characteristic therefore may not be taken as internal standard for comparative investigations with fully grown (mature) plants.

(2) A flexible or *acclimatization property* which allows physiological accomodation to a certain environment. Acclimatization gives rise to varying component composition of plant ("quality") as well as to differing pool sizes of components ("yield").

Both the homeostatic and flexible properties result from growth and developmental events during ontogeny. These events may be described quantitatively by growth functions. Our aim is to formulate appropriate growth functions which consider the properties of the phenotype potential.

What is claimed is:

1. A method for ascertaining phyto-specific characteristics for differently grown crops to differentiate between crop plants that have been subjected to different methods of growing, characterized in that the following plant parameters $FG_{max}$ = maximum fresh weight, $TG$ = dry weight $AcP$ = proportion by weight of cell components capable of swelling $A_{H2O}$ = proportion by weight of adsorptive water $W_{H2O}$ = proportion of cell water by weight are ascertained and are related to each other in the form of a ratio, thereby relativizing locality-dependent modifications.

2. A method as claimed in claim 1 wherein the following plant data $A_{H2O}$, $FG_{max}$ and $AcP$ are used to derive a first ratio relativizing the locality dependent modifications for the purpose of ascertaining a relativizing water characteristic x and the ascertained plant parameters $FG_{max}$, $TG$ and $W_{H2O}$ are used to derive a second ratio relativizing the locality dependent modification for ascertaining a relativizing dry weight characteristic y and the relativized water characteristic on the one hand and the relativized dry weight characteristic y on the other are used to derive a further ratio further relativizing the locality dependent modification.

3. The method as claimed in claim 1 wherein the AcP weight fraction is measured by an acetone powder method.

* * * * *